United States Patent Office 3,368,334
Patented Feb. 13, 1968

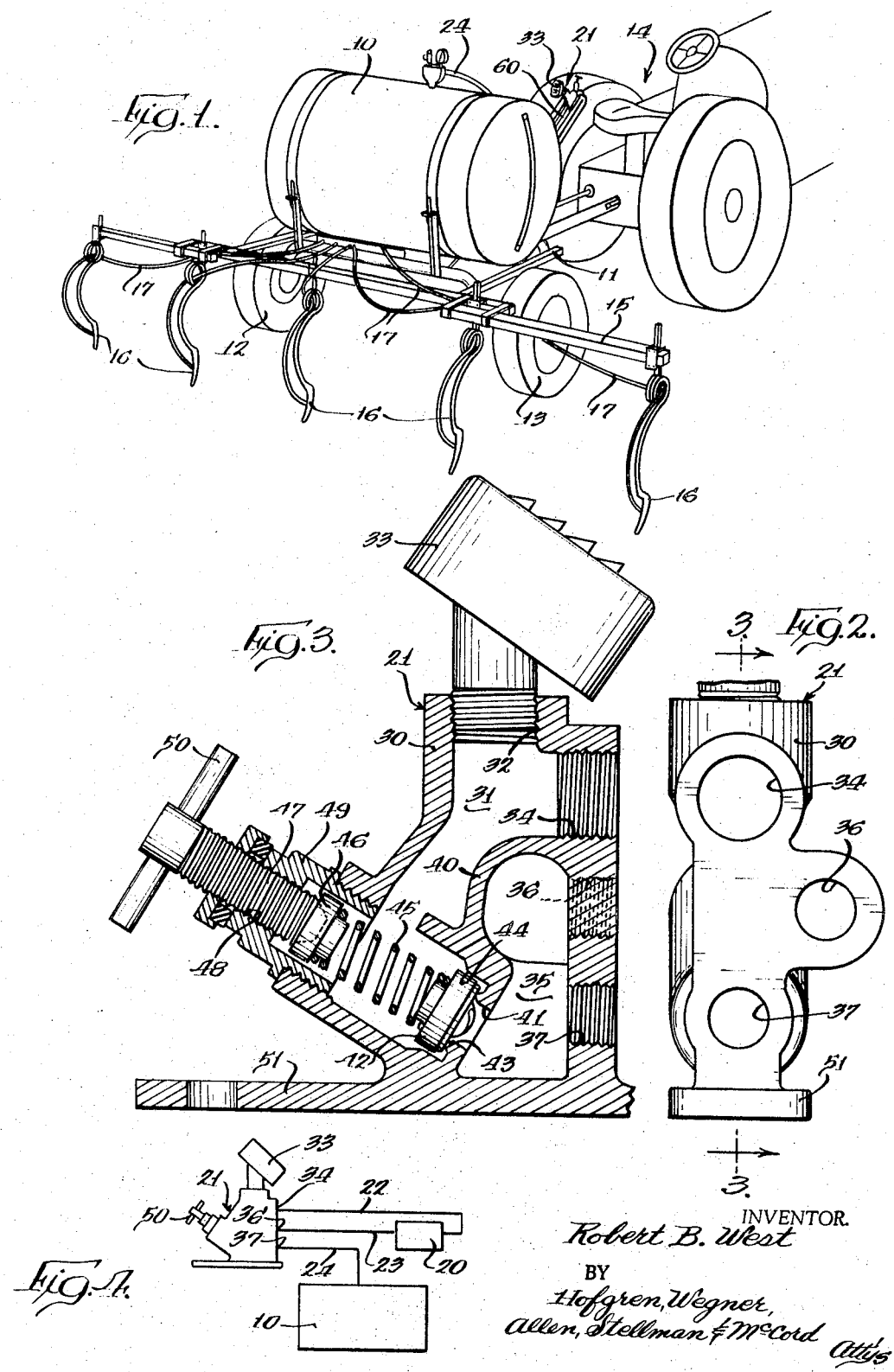

3,368,334
AIR FILTER AND AIR PRESSURE REGULATING UNIT
Robert B. West, Decatur, Ill., assignor to Tryco Manufacturing Company, Inc., a corporation of Illinois
Filed May 18, 1964, Ser. No. 367,979
1 Claim. (Cl. 55—385)

ABSTRACT OF THE DISCLOSURE

An apparatus for spraying fertilizer having an air filter connected to the inlet of a compressor through an inlet conduit, an outlet conduit connecting the outlet of the compressor to a tank holding the liquid fertilizer to be sprayed, a pressure regulating valve communicating the inlet and outlet conduits which valve opens to communicate the inlet and outlet conduits upon exceeding a preselected pressure in said tank, and an adjustable bias within the reach of an operator for adjusting the preselected pressure at which the pressure regulating valve opens.

---

This invention relates to a spraying system and, more particularly, to an air filter and air pressure regulating unit for use in such a system.

In fertilizer spray systems, it is common to have a tank with fertilizer solution supplied with air under pressure by a compressor with the compressor receiving air that has passed through a filter. Frequently, the air filter is located at a position where it can easily become plugged and the air pressure can not be controlled easily. Additionally, air that is not needed is wasted due to unloading of the compressor system to atmosphere.

An object of this invention is to provide a new and improved spraying system in which the air filter and regulating unit is located away from a substantial amount of the dust encountered in operation and is located for easy control by an operator.

Another object of the invention is to provide an air circulating regulator for a spray system in which the regulator is mounted on a control mounting post at a relatively high elevation and has an air filter for receiving air, with the regulator being easily adjusted by an operator for controlling the pressure of the air supplied to an applicator tank.

Still another object of the invention is to provide an air filter and regulating unit having a body with a first chamber connectable to the inlet side of the compressor and a second chamber connectable to the pressure side of the compressor and to the applicator tank with the body having an internal wall separating the chambers and a port in the wall for selectively placing the chambers in communication, and a pressure-responsive valve in the first chamber openable in response to excessive pressure in the second chamber whereby air can pass to the first chamber for recirculation.

Still another object of the invention is to provide a unit as defined in the preceding paragraph in which the pressure-responsive valve includes a valve member for closing the port with a spring to hold the valve member closed, and means for varying the spring compression to establish the force required to open the valve including a spring-engaging member threadably mounted on the body of the device and having a manually engageable external control handle.

Further objects and advantages will become apparent from the following detailed description taken in connection with the accompanying drawings in which:

FIG. 1 is a perspective view of the solution spraying system including a tractor or the like pulling the mechanism;

FIG. 2 is an end elevational view of the air filter and air pressure regulating unit;

FIG. 3 is a vertical section taken generally along the line 3—3 in FIG. 2; and

FIG. 4 is a circuit diagram of the air system.

As shown in FIG. 1, the fertilizer solution spraying system embodies a tank 10 mounted on a frame 11 having ground-engaging wheels 12 and 13. The frame 11 is connectable to a tractor 14 or other suitable device for moving the system along a field to be sprayed. The system includes a distributing device, such as a spray boom or, as shown in the drawing, a tool bar 15 extending across the rear of the frame 11 having a plurality of tools 16 which are supplied with a fertilizing solution through line 17 leading from the tank 10.

The system is shown in FIG. 4 for supplying air under pressure to the tank 10 from a compressor 20. The compressor is supplied with air from an air pressure regulating and filtering unit, indicated generally at 21. Air passes from the unit 21 to the compressor 20 through a line 22. A return line 23 from the compressor connects to the unit 21 with a line 24 extending from the unit 21 to the tank 10 for directing the compressed air to the tank.

The air filter and air pressure regulating unit 21 includes a body having a first upper interior chamber 31 with an inlet 32 to which an air filter 33 is connected and through which air may be drawn into the first chamber. The chamber 31 has an outlet 34 connectable to the line 22 for supplying filter air to the compressor 20.

The body 30 has a second chamber 35 at the lower part thereof beneath the first chamber 31 with an inlet port 36 connectable by the line 23 to the pressure side of the compressor whereby air under pressure enters the chamber 35. Compressed air is supplied to the tank 10 by the line 24 which connects to an outlet 37 for the chamber 35 which is formed in the wall of the body 30. Thus, compressed air in chamber 35 can pass from this chamber to the tank 10.

The chambers 31 and 35 are separated by a wall 40 therebetween, with this wall having an opening or port 41 placing the chambers in communication.

Valve means are provided in association with the port 41 for placing the chambers in communication when the air pressure exceeds a predetermined amount. The valve means for controlling the port 41 includes a valve member 42 engageable with an annular ridge 43 surrounding the port 41 to close the port. The valve member is guided in opening movement by a cylindrical well 44 formed in the wall 40. The pressure at which the valve member opens is determined by a spring 45 which is positioned between the valve member and a plunger 46 associated with a threaded stem 47, threaded, as indicated at 48, to cap 49 threaded in the body 30. The threaded stem 47 has a T-handle 50 to permit manual rotative adjustment of the stem and plunger 46 and thus control the compression of the spring 45.

The filter and air pressure regulating unit 21 has a mounting base 51 formed as part of the body whereby the unit can be attached to a control mounting post 60 extending vertically upward from the frame 11 to a location immediately to the rear of an operator seated on the tractor 14. By this mounting of the unit 21, the air filter 33 is located away from a great deal of the dust encountered in use of the spraying system. The T-handle 50 also is located for easy adjustment by the operator.

With the system as disclosed herein the operator by operating the handle 50 will determine the pressure within the tank 10 to control the rate of fertilizer application in accordance with the speed over the ground. Additionally, upon the occurrence of excessive pressure, the air within the chamber returns to the compressor by passing through the port 41. This air is re-used without refiltering to reduce the filtering load on the filter 33. The filter can be easily cleaned by blocking the outlet 34 from the chamber 31 and causing air to pass from chamber 35 into chamber 31 and then through the filter.

While this invention is susceptible of embodiment in many different forms, there is shown in the drawings and has herein been described in detail an embodiment of the invention with the understanding that the present disclosure is to be considered as an exemplification of the principles of the invention and is not intended to limit the invention to the embodiment illustrated. The scope of the invention will be pointed out in the appended claim.

I claim:

1. A fertilizer spraying system utilizing a spray tank holding a fluid under pressure comprising, a pressure tank for fluid, a frame with ground engaging wheels mounting said tank for movement over the ground, spray delivering means on said frame including fluid lines connected to said tank, a tractor connected to said frame for pulling thereof and having an operator's seat, a control mounting post extending upwardly and forwardly from said frame and having an upper end terminating to the rear of said seat to be within the reach of an operator seated on said seat, an air compressor having an inlet and an outlet, an air regulator and air filter unit mounted on the mounting post and adjacent the end thereof for supplying air to the tank and controlling the pressure thereof including an air inlet with the air filter connected thereto, said unit having a first chamber in the upper part of the body and a second chamber in the lower part of the body with a common wall therebetween, said inlet communicating with the first chamber, an outlet for said first chamber connected to the inlet of the compressor, an inlet to said second chamber connected to the compressor outlet, an outlet from the second chamber connected to the tank, an opening in said common wall, an adjustable pressure responsive valve fitted in said opening and openable upon excessive pressure in said second chamber, and a handle for adjusting the valve extending toward said seat whereby an operator can adjust the pressure setting during operation.

References Cited

UNITED STATES PATENTS

| | | | |
|---|---|---|---|
| 1,378,208 | 5/1921 | Hart | 230—22 |
| 1,791,012 | 2/1931 | Ray | 237—569 X |
| 1,961,758 | 6/1934 | Glab | 137—569 X |
| 2,044,039 | 6/1936 | Woodcock | 239—373 X |
| 2,365,755 | 12/1944 | Griffith | 239—286 X |
| 2,386,046 | 10/1945 | Fowler | 137—569 X |
| 2,475,686 | 7/1949 | Anderson | 239—172 X |
| 2,509,627 | 5/1950 | Bickerton et al. | 239—175 X |
| 2,595,098 | 4/1952 | Poglay | 230—38 |
| 2,596,473 | 5/1952 | Essick | 239—172 |
| 2,708,830 | 5/1955 | Sperry | 239—373 X |
| 2,715,992 | 8/1955 | Wilson | 230—31 |
| 2,745,425 | 5/1956 | Jensen | 230—30 X |
| 2,804,259 | 8/1957 | Ralston | 239—373 X |
| 2,866,422 | 12/1958 | Colson | 239—289 X |
| 3,016,200 | 1/1962 | Boehm | 239—373 X |

FOREIGN PATENTS

| | | |
|---|---|---|
| 23,487 | 10/1911 | Great Britain. |

FRANK W. LUTTER, *Primary Examiner.*

HARRY B. THORNTON, *Examiner.*

D. TALBERT, *Assistant Examiner.*